(12) United States Patent
Sharma et al.

(10) Patent No.: US 12,526,659 B2
(45) Date of Patent: Jan. 13, 2026

(54) MANAGEMENT OF CORE NETWORK CONNECTIVITY TO A UNIFIED DATA REPOSITORY IN A WIRELESS COMMUNICATIONS NETWORK

(71) Applicant: T-MOBILE INNOVATIONS LLC, Overland Park, KS (US)

(72) Inventors: Anuj Sharma, Broadlands, VA (US); Deepesh Belwal, Ashburn, VA (US); Anil Kumar Mariyani, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 337 days.

(21) Appl. No.: 18/135,993

(22) Filed: Apr. 18, 2023

(65) Prior Publication Data

US 2024/0357383 A1    Oct. 24, 2024

(51) Int. Cl.
*H04W 24/04*        (2009.01)
*H04W 40/24*        (2009.01)
*H04W 48/02*        (2009.01)

(52) U.S. Cl.
CPC ......... *H04W 24/04* (2013.01); *H04W 40/248* (2013.01); *H04W 48/02* (2013.01)

(58) Field of Classification Search
None
See application file for complete search history.

(56) References Cited

U.S. PATENT DOCUMENTS

| 2013/0157711 | A1* | 6/2013 | Lee | H04W 48/18 455/525 |
| 2016/0088545 | A1* | 3/2016 | Rönneke | H04W 8/18 455/418 |
| 2017/0026907 | A1* | 1/2017 | Min | H04W 52/0216 |

* cited by examiner

*Primary Examiner* — Anez C Ebrahim
(74) *Attorney, Agent, or Firm* — SHOOK, HARDY & BACON L.L.P.

(57) ABSTRACT

The technology described herein improves management of core network connectivity in order to limit network connectivity issues from spreading to other areas in the wireless network. A determination that a predetermined threshold of service requests and/or service request failures associated with one or more core network entities in a first geographic area has been exceeded during a first time period serves as the basis for preventing the one or more core network entities from receiving services from a backup UDR during a second period of time, the second time period subsequent to the first time period.

20 Claims, 5 Drawing Sheets

MANAGEMENT OF CORE NETWORK CONNECTIVITY TO A UNIFIED DATA REPOSITORY IN A WIRELESS COMMUNICATIONS NETWORK

SUMMARY

The present disclosure is directed, in part, to systems and methods for managing the core network connectivity to a unified data repository ("UDR") in a wireless communications network.

According to various aspects of the technology, the connectivity of one or more core network entities ("CNEs") on user devices to a UDR in a wireless communications network is managed to enhance overload protection in the network. When a wireless network experiences an event that causes a large amount of CNEs to request service from a UDR in a short period of time (e.g., when reconnecting after a temporary outage), the sudden influx of service requests may overload the UDR, which may result in service request failures and extend the amount of time CNEs are left without service. In response, the CNEs may resort to a backup connection and begin to request service from another UDR (e.g., a backup UDR), which may be located in another geographic area. However, the other UDR may also become overloaded.

CNEs located in the other geographic area who rely on the other UDR as their primary link may begin to experience service request failures and begin sending service requests on their backup links, potentially overloading more UDRs. As this continues, what was once a regionally isolated event can cascade across the entire wireless network and cause a decrease in the quality of service provided to users of the wireless network. Conventionally, if a network provider has any measures in place to minimize the network outage, it involves Quality of Service (QoS) based service rejections. However, conventional measures such as QoS are ineffective in restricting the impact of a regional issue from spreading. To provide better efficiency in connectivity management, the interfaces between CNEs and a UDR are updated to include location information so that it can be determined which area is affected and instruct UDRs which act as backup links to the affected area to reject service requests from CNEs within the affected area. This way, service requests from CNEs in the affected area will be funneled through their primary link UDR using whatever mechanisms are in place (e.g., QoS). While this does not immediately alleviate users in the affected area, the impacts may be restricted to the originating region and provide a better experience for users as a whole.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative aspects of the present invention are described in detail below with reference to the attached drawing figures, and wherein.

DETAILED DESCRIPTION

Figure 1:
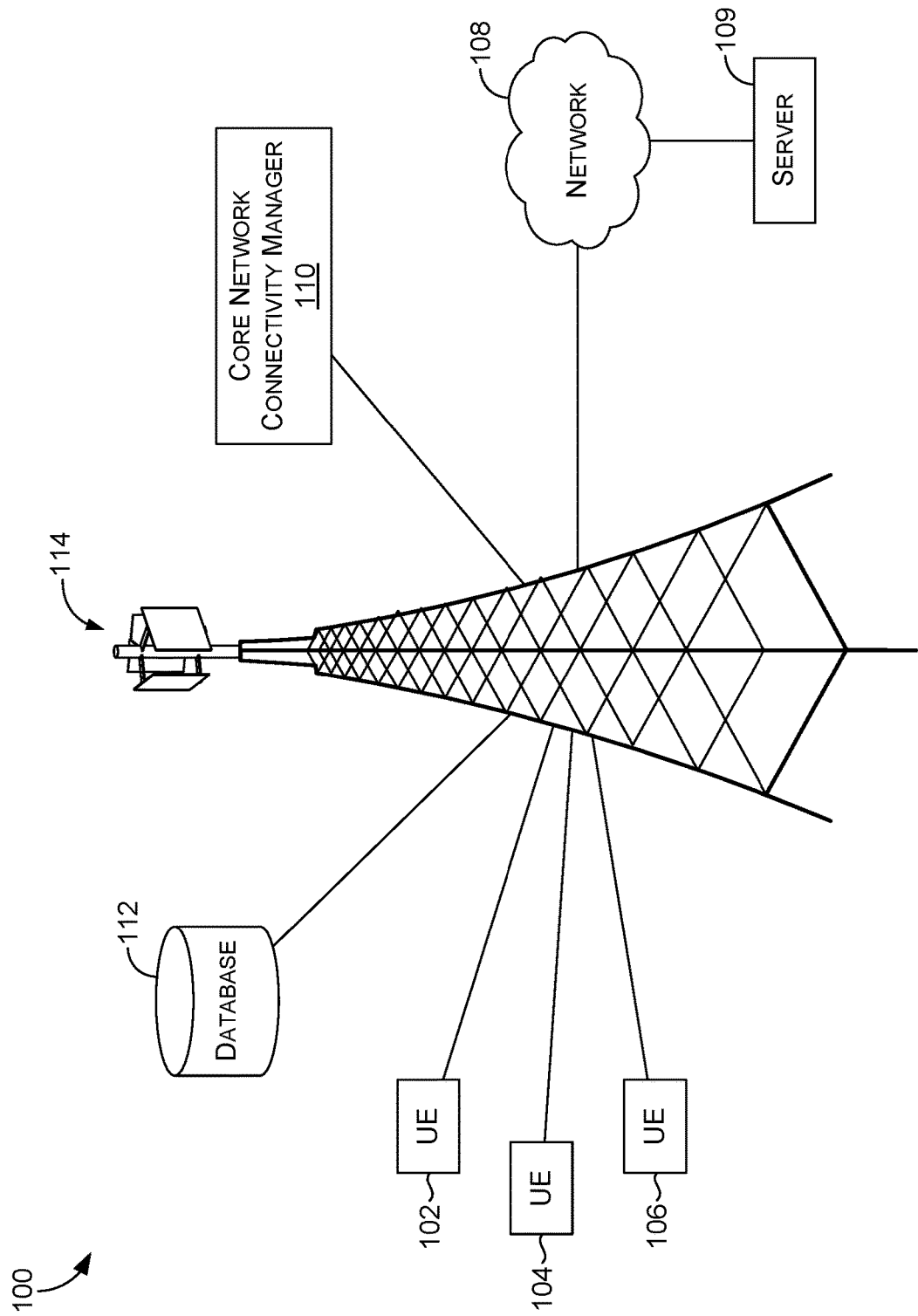
FIG. 1 depicts an exemplary wireless telecommunications network suitable for use in implementations of the present invention.

The subject matter of aspects of the invention is described with specificity herein to meet statutory requirements. However, the description itself is not intended to limit the scope of this patent. Rather, the inventor has contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, network providers store a variety of data in a UDR such as subscription data, policy data, structured data for exposure, application data, etc. Network providers may maintain several UDRs in different geographical areas to reduce latency. All UDRs may contain the same data, and core network entities (e.g., 5G core and 4G core components) generally connect to the UDR that is closest to them as their primary link in order to reduce latency, however, connections to other UDRs may be maintained as backup links. Occasionally, a network may experience an event that, for whatever reason, disconnects a large number of users in a certain area from the network. When everyone's devices from that area try to reconnect, the CNEs send service requests through their primary link and the primary link UDR may not be able to process so many requests at once, resulting in service request failures. When the CNEs can't get through on their primary link, they may start attempting their backup link(s). Because the event may be large and happen in a short period of time, the backup link UDRs may also have a hard time processing all the requests and begin rejecting service requests. Users in other areas who relied on that backup link UDR as their primary link UDR may not be able to be serviced and their CNEs start sending service requests to their backup link UDRs. In this way, the event cascades until it causes network-wide outages. Currently, if network providers have any measures in place to minimize the network outage it involves QoS based service rejections. QoS may be based on subscription types (priority customers/other customers) or service types (5G/IMS/4G). Using QoS allows call rejections to be made that will protect database systems and create a queue based on QoS priority for re-connecting, but this solution is ineffective in restricting the impact of a regional issue from going nationwide.

In order to solve this problem, the present disclosure is directed to systems and methods for managing the core network connectivity to a UDR in a wireless communications network. Part of the inventive solution is to enhance the overload protection mechanism by using the location of incoming service requests as a factor in service request rejections. Because not all CNEs currently provide location information through their interface with a UDR, these access interfaces would be updated to include location information to be communicated to the UDR. Once it can be determined which area is causing the overload, UDRs which act as backup links to CNEs in the affected area may be instructed to reject service requests from CNEs in the affected area. This way, service requests from CNEs in the affected area will be funneled through their primary link UDR using whatever mechanisms are in place (e.g., QoS) until the primary link UDR can work through it all. While this does not immediately alleviate users in the affected area, the impacts of any regional outages may be restricted to the originating region.

Accordingly, a first aspect of the present disclosure is directed to a method for managing core network connectivity to a unified data repository (UDR). The method includes receiving, at a first UDR, a service request from a core network entity. The service request includes location information for a core network entity that is requesting service, and the location information indicates a location within a first geographic area. The method further includes determining that a predetermined threshold of service request failures has been exceeded during a first time period from the core network entity in the first geographic area. The method further includes preventing the core network entity in the first geographic area from receiving services from the first UDR during a second time period. In aspects, the second time period is later than the first time period.

A second aspect of the present disclosure is directed to a system for managing core network connectivity to a unified data repository (UDR). The system includes a mobile communications network and a node configured to provide access to the mobile communications network. The system further includes a core network connectivity manager configured to receive, at a first UDR, a service request from a core network entity, wherein each the service request includes location information for a core network entity that is requesting service, and the location information indicates a location within a first geographic area. The core network connectivity manager is further configured to determine that a predetermined threshold of service request failures has been exceeded during a first time period from the core network entity in the first geographic area. The core network connectivity manager is further configured to prevent the core network entity in the first geographic area from receiving services from the first UDR during a second time period. In some aspects, the second time period is later than the first time period.

A third aspect of the present disclosure is directed to another method for managing core network connectivity to a unified data repository (UDR). The method includes receiving, at a first UDR, a service request from a core network entity, wherein the service request includes location information for a core network entity that is requesting service, and the location information indicates a location within a first geographic area. The method further includes determining that a predetermined threshold of service request failures has been exceeded during a first time period from the core network entity in the first geographic area. The method further includes preventing the core network entity in the first geographic area from receiving services from a second UDR during a second time period. In some aspects, the second time period is later than the first time period.

A fourth aspect of the present disclosure is directed to another method for managing core network connectivity to a unified data repository (UDR). The method includes receiving, at a first UDR, a service request from a core network entity, wherein the service request includes location information for a core network entity that is requesting service, and wherein the location information indicates a location within a first geographic area. The method further includes determining that a predetermined threshold of service requests received from the core network entity in the first geographic has been exceeded during a first time period. The method further includes preventing the core network entity in the first geographic area from receiving services from a second UDR during a second time period. In some aspects, the second time period is later than the first time period based.

A fifth aspect of the present disclosure is directed to another method for managing core network connectivity to a unified data repository (UDR). the method includes receiving, at a first UDR, a service request from a core network entity, wherein the service request includes location information for a core network entity that is requesting service, and the location information indicates a location within a first geographic area. The method further includes determining that a predetermined threshold of service requests received from the core network entity in the first geographic has been exceeded during a first time period. The method further includes preventing the core network entity in the first geographic area from receiving services from the first UDR during a second time period. In some aspects, the second time period is later than the first time period.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Aspects herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Aspects may take the form of a hardware embodiment, or an embodiment combining software and hardware. Some aspects may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 200 shown in FIG. 2. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more cell sites (i.e., managed by a base station), one or more cell towers (e.g., having an antenna) associated with each base station or cell site, a gateway, a backhaul server that connects two or more base stations, a database, a power supply, sensors, and other components not discussed herein, in various aspects.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In aspects, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In aspects, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (SS-SINR) value/measurement, and/or the like. Alternatively or additionally, in some aspects, signal strength may also be measured and provided in terms of channel state information (CSI) values.

Referring to FIG. 1, an exemplary network environment suitable for use in implementing aspects of the present disclosure is provided. Such a network environment as illustrated in FIG. 1 is designated generally as network environment 100. Network environment 100 is simplified to illustrate devices, components, and modules in merely one of many suitable configurations and arrangements, such that configurations and arrangements of devices, components, and modules relative to one another, as well as the and the quantity of each of the devices, components, and modules, can vary from what is depicted (e.g., devices, components, and modules may be omitted and/or could be greater in quantity than shown). As such, the absence of components from FIG. 1 should be not be interpreted as limiting the present invention to exclude additional components and combination(s) of components. Similarly, the network environment 100 should not be interpreted as imputing any dependency between devices, components, and modules, and nor imputing any requirements with regard to each of the devices, components, modules, and combination(s) of such, as illustrated in FIG. 1. Also, it will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake.

Network environment 100 includes user devices 102, 104, and 106, access point 114 (which may be a cell site, node, base transceiver station (also known as a base station), communication tower, a small cell, or the like), network 108, server 109, core network connectivity manager 110, and database 112. In network environment 100, user devices can take on a variety of forms, such as a personal computer (PC), a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the server 109 or the computing device 200 of FIG. 2) that communicates via wireless communications with the access point 114 in order to interact with a public or private network. In this regard, the user device can be any mobile computing device that communicates by way of a wireless network, for example, a 1× circuit voice, a 3G network (e.g., CDMA, CDMA2000, WCDMA, GSM, UMTS), a 4G network (WiMAX, LTE, HSDPA), a 5G network, or any other type of network.

In some cases, the user devices 102, 104, and 106 in network environment 100 can optionally utilize network 108 to communicate with other computing devices (e.g., a mobile device(s), a server(s), a personal computer(s), etc.) through access point 114. The network 108 may be a telecommunications network(s), or a portion thereof. A telecommunications network might include an array of devices or components (e.g., one or more base stations), some of which are not shown. Those devices or components may form network environments similar to what is shown in FIG. 1, and may perform methods in accordance with the present disclosure. Components, such as terminals, links, and nodes (as well as other components) can provide connectivity in various implementations. Network 108 can include multiple networks, as well as being a network of networks, but is shown in more simple form so as to not obscure other aspects of the present disclosure.

Continuing, network 108 can be part of a telecommunication network that connects subscribers to their immediate service provider. In some instances, network 108 can be associated with a telecommunications provider that provides services to user devices 102, 104, and 106. For example, network 108 may provide voice, SMS, video, or data services to user devices corresponding to users that are registered or subscribed to utilize the services provided by a telecommunications provider. Similarly, network 108 may provide services to user devices that correspond to relays, fixed sensors, internet of things (IoT) enabled devices, or any other device that provide connectivity or data to other devices. Network 108 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network. In aspects, the network 108 may enable communication over both TDD and FDD technology.

Generally, access point 114 is configured to communicate with user devices, such as user devices 102, 104, and 106 that are located within the geographical area, or cell, covered by radio antennas of a cell site (i.e. access point 114). Access point 114 can include one or more base stations (such as a gNodeB), base transmitter stations, radios, antennas, antenna arrays, power amplifiers, transmitters/receivers, digital signal processors, control electronics, GPS equipment, and the like. Access point 114 can include a wireless communications station that is installed at a fixed location, (e.g., a telecommunication tower) or a mobile base station (e.g., small cell) in some aspects. In some aspects, access point 114 also includes or is associated with an LTE System Manager (LSM) configured to manage a master list (e.g., a table) of amplitude weights. The list of amplitude weights may include a plurality of amplitude, phase, and power weights applicable to a plurality of antennas, antenna model numbers, radios, tilt angles of antennas, and the like. The listing may also include amplitude, phase, and power weights applicable to various broadcast configurations, such as multi-beam or unified beam.

Illustrative wireless telecommunications technologies include CDMA, CDMA2000, GPRS, TDMA, GSM, WCDMA, UMTS, and the like. A radio might additionally or alternatively facilitate other types of wireless communications including Wi-Fi, WiMAX, LTE, 5G, or other VoIP communications. As can be appreciated, in various aspects, the radio can be configured to support multiple technologies and/or multiple radios can be utilized to support multiple technologies.

The back-end system can include one or more computing devices or servers 108, which are connected to the RAN. For example, machine-learning algorithms can be leveraged to identify patterns and predict changes in the network environment, including movement patterns of UEs. Machine learning algorithms include Regression algorithms, Instance-Based algorithms, Regularization algorithms, Decision Tree algorithms, Bayesian algorithms, Clustering algorithms, Association Rule Learning algorithms, Artificial Neural Network algorithms, Deep Learning algorithms, Dimensionality Reduction algorithms, Ensemble algorithms, to name a few.

Core network connectivity manager 110 may exist as a standalone component or may be integrated with another component in network environment 100. The location of core network connectivity manager 110 within network environment 100 is not important as long as it can perform its intended functions. In order to enhance overload protection in a wireless network, the core network connectivity is managed. The core network connectivity is managed by observing and responding to events that occur within the wireless network.

Core network connectivity manager 110 is able to observe and respond to events within network 100 at least partially due to one or more access interfaces between a UDR (e.g., a component of database 112) and one or more CNEs (e.g., application(s) on user device 102 that are clients of database 112) being updated to include location information for incoming messages to the UDR from the one or more CNEs. Without updates, the UDR does not receive information indicating a location of the CNEs that it is servicing and the core network connectivity manager 110 may not be able to determine a response to isolate the event to a geographic area being affected by a network event such as a temporary network outage. A non-limiting example of CNEs includes a Unified Data Management (UDM), a Home Subscriber Server (HSS), Policy and Charging Rules Function (PCRF), Call Session Control Function (CSCF), etc. The one or more access interfaces could be any component that communicates messages between CNEs and a UDR. The one or more access interfaces could include components such as a NUDM, which is responsible for interfacing between a UDM and the UDR, a Lightweight Directory Access Protocol (LDAP), a JavaScript Object Notation (JSON), etc.

The location information that the one or more access interfaces include in communications to the UDR could comprise any indication about a CNE's location within a geographic area so that the UDR is aware of the location of the CNE it is servicing. For example, the information could include a particular location of a CNE that is requesting service (e.g., which access point 114 is being used), or the information could be in terms of zonal or regional information. The location information could also comprise information that indicates the UDR as being a primary link for the CNE with or without including zonal or regional location information. Using location information that indicates the UDR as being the primary link without including zonal or regional location information would still be within the inventive concept of this disclosure because the invention could still be practiced to isolate a network outage to a UDR that is servicing a geographic area being affected by overload conditions. For example, in a typical wireless network, there may be multiple UDRs that contain the same information and provide service to CNEs on user devices. User devices will generally attempt to connect and request service from the nearest UDR as their primary link in order to reduce latency while still maintaining one or more backup links to other UDR(s) incase service is interrupted on the primary link. In this way, the location information is primarily helpful by indicating which CNEs are in an affected geographic area and should be isolated, to which particular UDR they should be isolated to receiving services from, and which UDR(s) should be prevented from providing service to the CNEs in the affected geographical area.

An event in network environment 100 such as a temporary outage may be observed by core network connectivity manager 110 (or other component of network environment 100 and then communicated to core network connectivity manager 110) when a predetermined threshold of service requests, or service request failures, is exceeded within network environment 100. For example, a UDR providing services to CNEs in an affected geographic area may receive a sudden influx of service requests that may indicate that a network event is occurring that should be responded to in order to limit its cascading effect to the rest of the network (e.g., when a predetermined threshold of service requests is exceeded). Somewhat similarly, a UDR providing services to CNEs in an affected geographic area may initiate an overload protection mechanism and reject service requests to protect itself (e.g., when a predetermined threshold of service request failures is exceeded). Additionally, due to the location information that the access interfaces have been updated to include in communications to the UDR, core network connectivity manager 110 may also observe which geographic area(s), CNEs, and/or UDR(s) are affected in order to determine a response. For example, core network connectivity manager 110 could observe that CNEs in a Northwestern region of the United States are experiencing an event based on a predetermined threshold (e.g., service request failures) being exceeded and analyzing the location information associated with the CNEs. Making a determination that a predetermined threshold has been exceeded may involve core network connectivity manager 110 analyzing whether a predetermined number of instances (e.g., service request failures) has been met and/or exceeded within a certain period of time (e.g., a first time period).

In response to determining that a predetermined threshold has been exceeded, core network connectivity manager 110 may alter a connectivity configuration between a database 112 (e.g., a UDR) and clients of the database 112 (e.g., one or more CNEs on one or more user devices). For example, based on the determination that the predetermined threshold has been exceeded, core network connectivity manager 110 may identify an affected geographic area (e.g., a first geographic area) based on location information of CNEs associated with the analysis of whether or not a predetermined number of instances (e.g., service request failures) has been met and/or exceeded within a certain period of time (e.g., a first time period). Identifying the affected geographic area also indicates which UDR is primarily responsible for providing services to the affected geographic area (e.g., a primary link UDR) based upon a UDR's proximity to the affected geographic area and/or known coverage areas of UDRs within network environment 100. After identifying the UDR primarily responsible for providing services to the affected geographic area, core network connectivity manager 110 may alter the connectivity configuration such that CNEs in the affected geographic area are prevented from receiving service from a different UDR (e.g., a backup link UDR) than the UDR primarily responsible for providing services to the affected geographic area, thereby containing the potential cascading effect from causing service interruptions in other parts of network environment 100 beyond the affected geographical area and the UDR primarily responsible for providing services to the affected geographical area. Core network connectivity manager 110 may accomplish such a connectivity configuration by instructing UDRs other than the UDR primarily responsible for providing services to the affected geographic area to reject service requests from CNEs associated with location information that indicates a location in the affected geographic area. Core network connectivity manager 110 could also accomplish such a connectivity configuration by instructing the CNEs not to request service from UDRs other than the UDR primarily responsible for providing services to the affected geographic area (e.g., instructing the CNEs not to initiate service requests from backup link UDRs).

Core network connectivity manager 110 may change the connectivity configuration (e.g., from a first connectivity configuration to a second connectivity configuration) to prevent the CNEs from receiving services for a period of time (e.g., a second period of time) following the determination that the predetermined threshold has been exceeded. The period of time could be a defined period of time or an undefined period of time. For example, the period of time could last until there is an indication that removing the preventive measures (e.g., reverting back to a first connectivity configuration) won't result in propagating the network issues. For example, after determining that a predetermined threshold (which could be a different threshold amount) has not been exceeded during a third period of time, the third period of time subsequent to, or concurrent with, the second period of time, the CNEs may have access to receive services from the backup link UDR restored.

Figure 2:
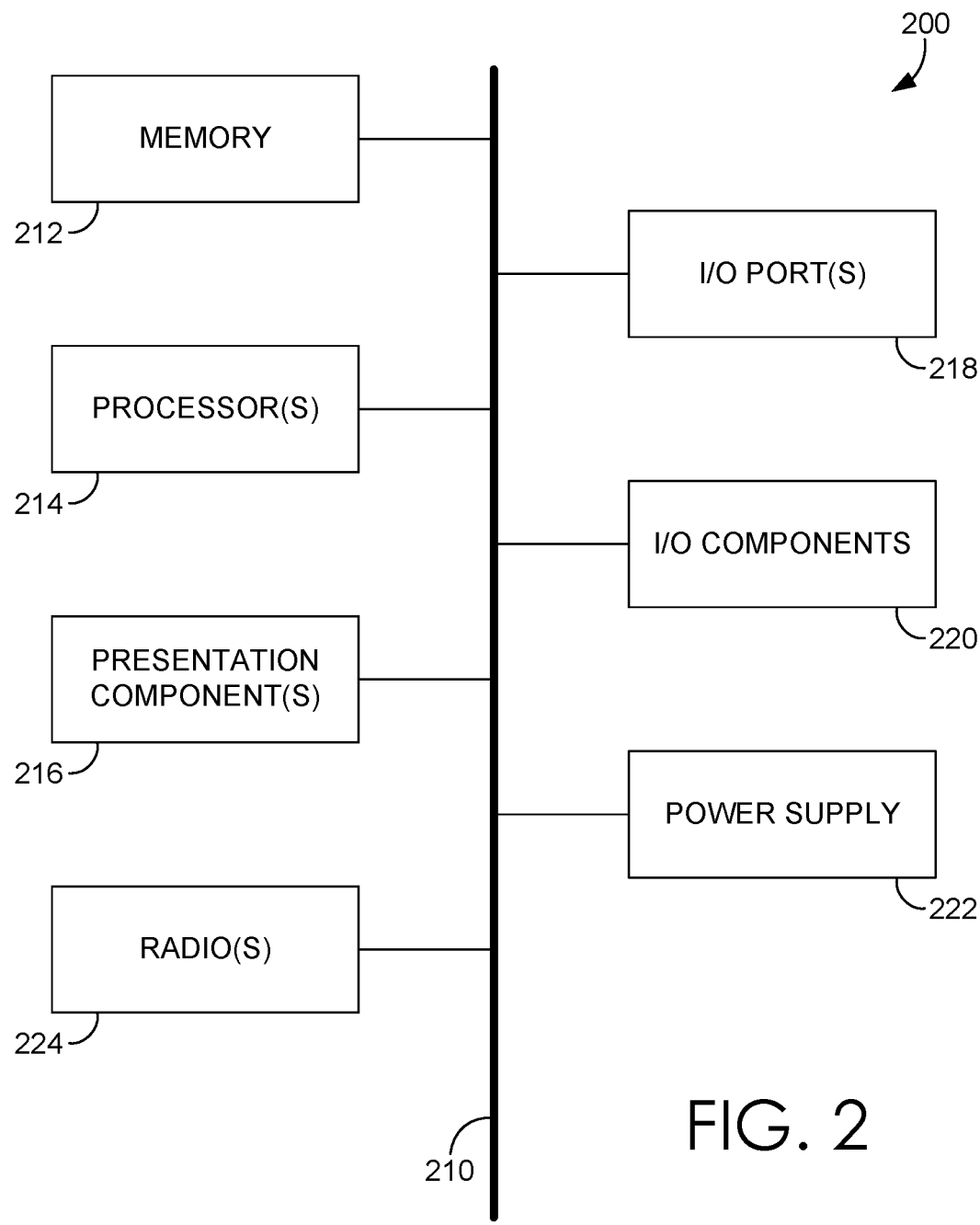
FIG. 2 depicts a block diagram of an exemplary computing environment suitable for use in implementing aspects herein.

Turning to FIG. 2, computing device 200 includes a bus 202 that directly or indirectly couples the following devices: memory 204, one or more processors 206, one or more presentation components 208, input/output (I/O) ports 210, input/output (I/O) components 212, and an illustrative power supply 214. Bus 202 represents what may be one or more busses (such as an address bus, data bus, or combination thereof). Although the various blocks of FIG. 2 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 2 is merely illustrative of an example computing device that can be used in connection with one or more aspects of the present invention. Distinction is not made between such categories as "workstation," "server," "laptop," "handheld device," etc., as all are contemplated within the scope of FIG. 2 and reference to "computing device."

Computing device 200 typically includes a variety of computer-readable media. Computer-readable media can be any available media that can be accessed by computing device 200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 200. Computer storage media is non-transitory. In contrast to communication media, computer storage media is not a modulated data signal or any signal per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 204 includes computer-storage media in the form of volatile and/or nonvolatile memory. The memory may be removable, non-removable, or a combination thereof. Example hardware devices include solid-state memory, hard drives, optical-disc drives, etc. Computing device 200 includes one or more processors that read data from various entities such as memory 204 or I/O components 212. Presentation component(s) 208 present data indications to a user or other device. Example presentation components include a display device, speaker, printing component, vibrating component, etc.

I/O ports 210 allow computing device 200 to be logically coupled to other devices including I/O components 212, some of which may be built in. Illustrative components include a microphone, joystick, game pad, satellite dish, scanner, printer, wireless device, etc.

Radio 216 represents a radio that facilitates communication with a wireless telecommunications network. Illustrative wireless telecommunications technologies include CDMA, GPRS, TDMA, GSM, W-CDMA, EDGE, CDMA2000, and the like. Radio 216 might additionally or alternatively facilitate other types of wireless communications including Wi-Fi, WiMAX, LTE, 5G, or other VoIP communications. As can be appreciated, in various aspects, radio 216 can be configured to support multiple technologies and/or multiple radios can be utilized to support multiple technologies.

Figure 3:
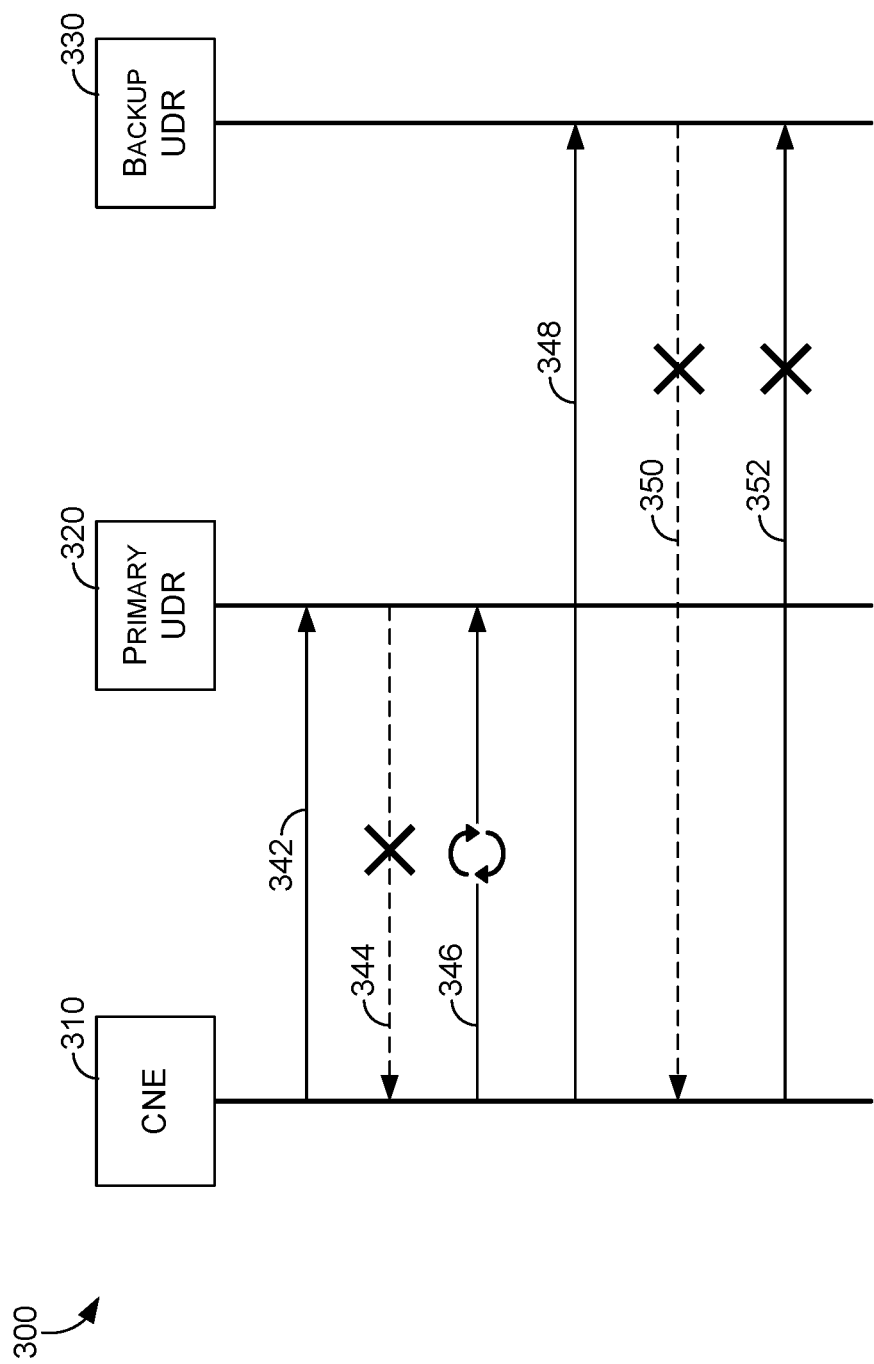
FIG. 3 depicts a diagram of an exemplary core network environment suitable for use in implementations of the present invention.

FIG. 3 provides an exemplary diagram unto which various implementations of the present invention may be employed using any or all of the components and component interactions previous described in FIGS. 1-2. Core network 300 is but one example of a suitable core network and is not intended to suggest any limitation as to the scope of use or functionality of the invention. Neither should the core network 300 be interpreted as having any dependency or requirement relating to any one or combination of components illustrated.

The exemplary core network 300 includes CNE 310, Primary UDR 320, and Backup UDR 330. CNE 310 comprises one or more CNEs in accordance with the preceding disclosure. Primary UDR 320 may comprise a UDR that is primarily responsible for providing services to CNE 310 in accordance with the preceding disclosure. Backup UDR 330 may comprise a backup link UDR other than the primary link UDR (e.g., Primary UDR 320) in accordance with the preceding disclosure.

At step 342, CNE 310 may send one or more service requests to Primary UDR 320. The one or more service requests to Primary UDR 320 may contain information that indicates a location of CNE 310 within a first geographic area. In some aspects, at step 342, a determination is made that a predetermined threshold of service requests by CNE 310 has been exceeded and CNE 310 is prevented from receiving services from Backup UDR 330. At step 344, Primary UDR 320 may reject the one or more service requests from CNE 310, resulting in one or more service request failures. In some aspects, at step 344, a determination is made that a predetermined threshold of service request failures has been exceeded and CNE 310 is prevented from receiving services from Backup UDR 330. At step 346, after CNE 310 has been prevented from receiving services from Backup UDR 330, CNE 310 may repeatedly attempt to receive services from Primary UDR 320 using whatever overload mechanisms are in place (e.g., QoS priority) until service is restored. At step 348, CNE 310 may send one or more service requests to Backup UDR 330. The one or more service requests to Backup UDR 330 may contain information that indicates a location of CNE 310 within the first geographic area. In some aspects, at step 348, a determination is made that a predetermined threshold of service requests by CNE 310 has been exceeded and CNE 310 is prevented from receiving services from Backup UDR 330. At step 350, Backup UDR 330 may reject the one or more service requests from CNE 310, resulting in one or more service request failures. In some aspects, at step 350, a determination is made that a predetermined threshold of service request failures has been exceeded and CNE 310 is prevented from receiving services from Backup UDR 330.

At step 352, CNE 310 may be prevented from receiving service from Backup UDR 330 by instructing Backup UDR 330 to reject service requests from CNE 310 and/or instructing CNE 310 to not request services from Backup UDR 330.

Figure 4:
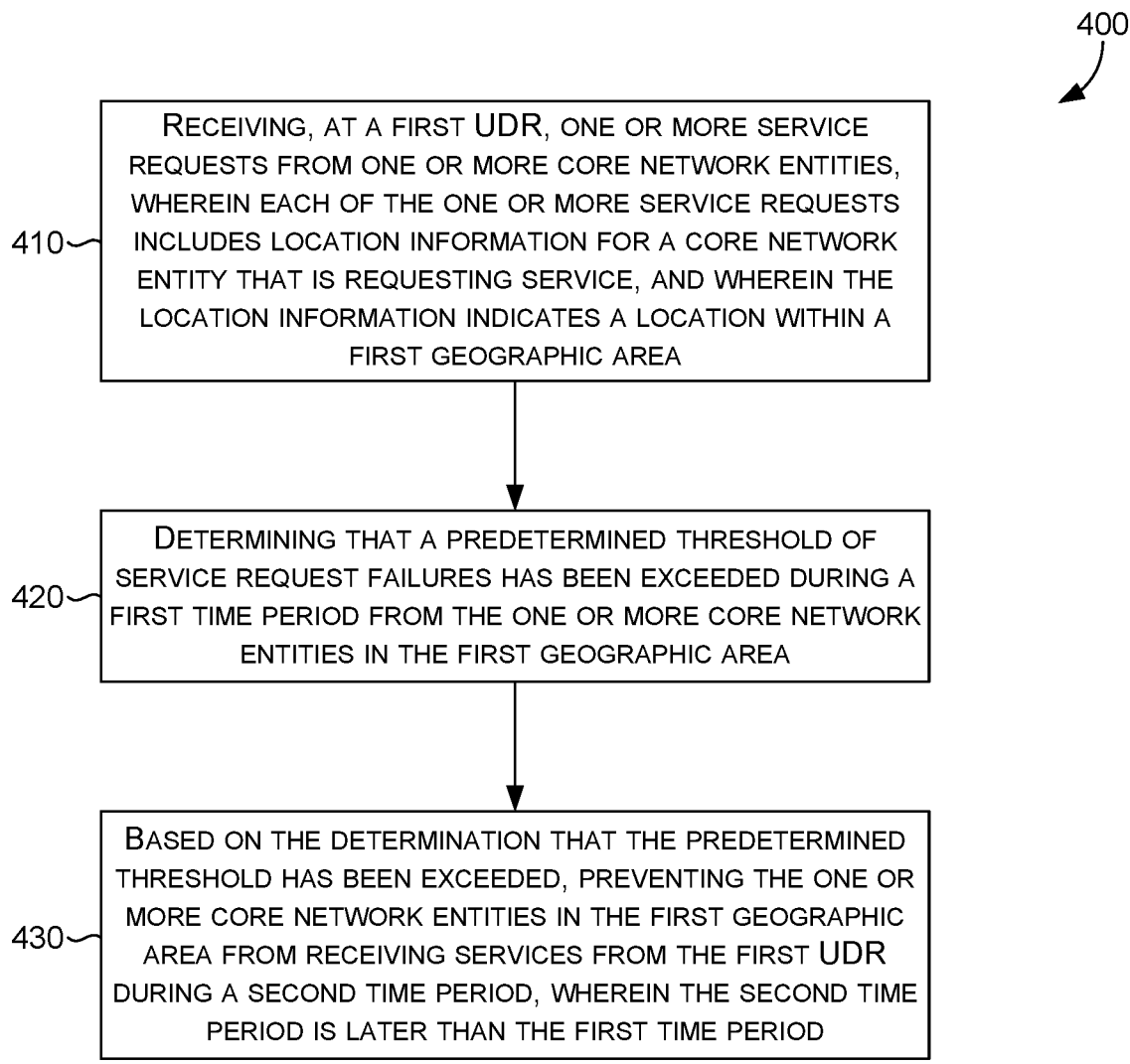
FIG. 4 depicts a flowchart of an exemplary method for managing core network fallback connectivity in accordance with aspects of the present invention.

Now referring to FIG. 4, method 400, described herein, can be implemented using any or all of the components and component interactions previously described in FIGS. 1-3. As such, the method is discussed briefly for brevity, though it will be understood that the previous discussion and details described therein can be applicable to aspects of the methods of FIG. 4. Additionally or alternatively, it will be understood that the method discussed herein can be implemented or performed via the execution of computer-readable instructions stored on computer readable media, by one or more processors.

A flow diagram showing a method 400 for dynamic resource allocation management related to wireless access technologies on a common range of frequencies is provided in accordance with any one or more aspects of the present disclosure. At block 410, one or more service requests from one or more core network entities are received at a first UDR, the one or more service requests including location information for a core network entity that is requesting service, and the location information indicating a location within a first geographic area. At block 420, a predetermined threshold of service request failures during a first time period from the one or more core network entities in the first geographic area is determined. At block 430, the one or more core network entities in the first geographic area are prevented from receiving services from the first UDR during a second time period based on the determination that the predetermined threshold has been exceeded, the second time period being later than the first time period.

Figure 5:
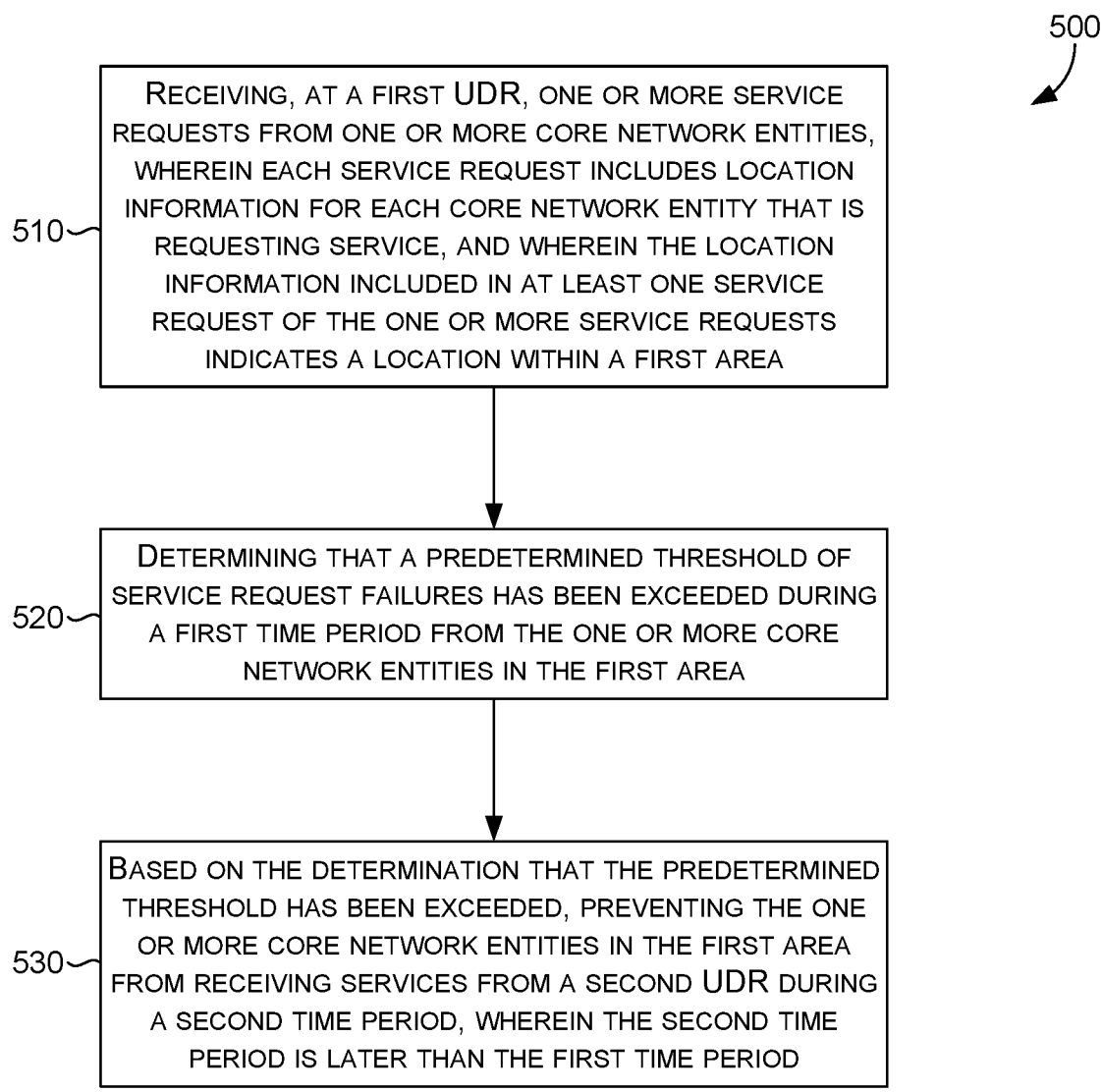
FIG. 5 depicts a flowchart of another exemplary method for managing core network fallback connectivity in accordance with aspects of the present invention.

With reference to FIG. 5, method 500, described herein, can be implemented using any or all of the components and component interactions previously described in FIGS. 1-4. As such, the method is discussed briefly for brevity, though it will be understood that the previous discussion and details described therein can be applicable to aspects of the methods of FIG. 5. Additionally or alternatively, it will be understood that the method discussed herein can be implemented or performed via the execution of computer-readable instructions stored on computer readable media, by one or more processors.

A flow diagram showing a method 500 for dynamic resource allocation management related to wireless access technologies on a common range of frequencies is provided in accordance with any one or more aspects of the present disclosure. At block 510, one or more service requests from one or more core network entities are received at a first UDR, the one or more service requests including location information for a core network entity that is requesting service, and the location information indicating a location within a first geographic area. At block 520, a predetermined threshold of service request failures during a first time period from the one or more core network entities in the first geographic area is determined. At block 530, the one or more core network entities in the first geographic area are prevented from receiving services from a second UDR during a second time period based on the determination that the predetermined threshold has been exceeded, the second time period being later than the first time period.

The invention claimed is:

1. A method for managing core network connectivity to a unified data repository (UDR), the method comprising:
receiving, at a first UDR, one or more service requests from one or more core network entities, wherein each of the one or more service requests includes location information for a core network entity that is requesting service, and wherein the location information indicates a location within a first geographic area;
determining that a predetermined threshold of service request failures has been exceeded during a first time period from the one or more core network entities in the first geographic area; and
based on the determination that the predetermined threshold has been exceeded, transmitting, by the first UDR, one or more service rejection messages to the one or more core network entities in the first geographic area during a second time period, thereby preventing the one or more core network entities in the first geographic area from receiving services from the first UDR during the second time period, wherein the second time period is later than the first time period.

2. The method of claim 1 further comprising updating one or more access interfaces between the first UDR and the one or more core network entities to include the location information in each of the one or more service requests.

3. The method of claim 2, wherein the one or more access interfaces may comprise one or more of NUDM, Lightweight Directory Access Protocol (LDAP), and JavaScript Object Notation (JSON).

4. The method of claim 1, wherein the one or more core network entities may comprise one or more of Unified Data Management (UDM), Home Subscriber Service (HSS), Policy and Charging Rules Function (PCRF), and Call Session Control Function (CSCF).

5. The method of claim 1, wherein preventing the one or more core network entities in the first geographic area from receiving services from the first UDR during a second time period comprises instructing the first UDR to reject service requests from the one or more core network entities.

6. The method of claim 1, wherein preventing the one or more core network entities in the first geographic area from receiving services from the first UDR during a second time period comprises instructing the one or more core network entities not to request service from the first UDR.

7. The method of claim 1, wherein access to receive services from the first UDR is restored after determining that the predetermined threshold has not been exceeded during a third period of time, the third period of time subsequent to, or concurrent with, the second period of time.

8. A system for managing core network connectivity to a unified data repository (UDR), the system comprising:
a mobile communications network;
at least one node configured to provide access to the mobile communications network; and
a core network connectivity manager configured to:
receiving, at a first UDR, one or more service requests from one or more core network entities, wherein each of the one or more service requests includes location information for a core network entity that is requesting service, and wherein the location information indicates a location within a first geographic area;
determining that a predetermined threshold of service request failures has been exceeded during a first time period from the one or more core network entities in the first geographic area; and
based on the determination that the predetermined threshold has been exceeded, causing the first UDR to transmit one or more service rejection messages to the one or more core network entities in the first geographic area during a second time period, thereby preventing the one or more core network entities in the first geographic area from receiving services from the first UDR during the second time period, wherein the second time period is later than the first time period.

9. The system of claim 8 further comprising updating one or more access interfaces between the first UDR and the one or more core network entities to include the location information in each of the one or more service requests.

10. The system of claim 9, wherein the one or more access interfaces may comprise one or more of NUDM, Lightweight Directory Access Protocol (LDAP), and JavaScript Object Notation (JSON).

11. The system of claim 8, wherein the one or more core network entities may comprise one or more of Unified Data Management (UDM), Home Subscriber Service (HSS), Policy and Charging Rules Function (PCRF), and Call Session Control Function (CSCF).

12. The system of claim 8, wherein preventing the one or more core network entities in the first geographic area from receiving services from the first UDR during a second time period comprises instructing the first UDR to reject service requests from the one or more core network entities.

13. The system of claim 8, wherein preventing the one or more core network entities in the first geographic area from receiving services from the first UDR during a second time period comprises instructing the one or more core network entities not to request service from the first UDR.

14. The system of claim 8, wherein access to receive services from the first UDR is restored after determining that the predetermined threshold has not been exceeded during a third period of time, the third period of time subsequent to, or concurrent with, the second period of time.

15. A method for managing core network connectivity to a unified data repository (UDR), the method comprising:
receiving, at a first UDR, one or more service requests from one or more core network entities, wherein each service request includes location information for each core network entity that is requesting service, and wherein the location information included in at least one service request of the one or more service requests indicates a location within a first area;
determining that a predetermined threshold of service request failures has been exceeded during a first time period from the one or more core network entities in the first area; and
based on the determination that the predetermined threshold has been exceeded, transmitting, by a second UDR, one or more rejection messages to the one or more core network entities in the first area during a second time period, thereby preventing the one or more core network entities in the first area from receiving services from the second UDR during the second time period, wherein the second time period is later than the first time period.

16. The method of claim 15 further comprising updating one or more access interfaces between the first UDR and the one or more core network entities to include the location information in each of the one or more service requests.

17. The method of claim 16, wherein the one or more access interfaces may comprise one or more of NUDM, Lightweight Directory Access Protocol (LDAP), and JavaScript Object Notation (JSON).

18. The method of claim 15, wherein the one or more core network entities may comprise one or more of Unified Data Management (UDM), Home Subscriber Service (HSS), Policy and Charging Rules Function (PCRF), and Call Session Control Function (CSCF).

19. The method of claim 15, wherein preventing the one or more core network entities in the first geographic area from receiving services from the second UDR during a second time period comprises instructing the second UDR to reject service requests from the one or more core network entities.

20. The method of claim 15, wherein preventing the one or more core network entities in the first geographic area from receiving services from the second UDR during a second time period comprises instructing the one or more core network entities not to request service from the second UDR.

* * * * *